United States Patent [19]

Dmytriw

[11] Patent Number: 4,616,441
[45] Date of Patent: Oct. 14, 1986

[54] FISHING FLOAT

[76] Inventor: Walter Dmytriw, 65 Southport St., Apt. 404, Toronto, Ontario, Canada, M6S 3N6

[21] Appl. No.: 753,511

[22] Filed: Jul. 10, 1985

[30] Foreign Application Priority Data

Jul. 12, 1984 [CA] Canada .................................. 458726

[51] Int. Cl.⁴ ............................................. A01K 93/00
[52] U.S. Cl. ...................................................... 43/44.91
[58] Field of Search ................... 43/44.9, 44.91, 44.87, 43/43.1, 44.92

[56] References Cited

U.S. PATENT DOCUMENTS

| | | | |
|---|---|---|---|
| 1,296,386 | 3/1919 | Harris | 43/43.1 |
| 2,527,437 | 10/1950 | Matras | 43/44.87 |
| 2,763,088 | 9/1956 | Cowsert | 43/44.9 |
| 2,777,238 | 1/1957 | Taylor | 43/44.9 |
| 2,791,060 | 5/1957 | Kender | 43/44.9 |

FOREIGN PATENT DOCUMENTS 1259964 3/1961 France ........................... 43/44.87

Primary Examiner—Gene P. Crosby
Attorney, Agent, or Firm—Rogers, Bereskin & Parr

[57] ABSTRACT

A fishing float has two body members which are formed as shells and which can be of generally similar size. The body members include complementary coupling lips and slits are provided in the coupling lips for a fishing line. This enables the float to be readily fixed to a fishing line. A rib is provided in one lip and a groove in the other coupling lip. The rib and groove are preferably so dimensioned as to provide a resilient clamping action on the float.

22 Claims, 8 Drawing Figures

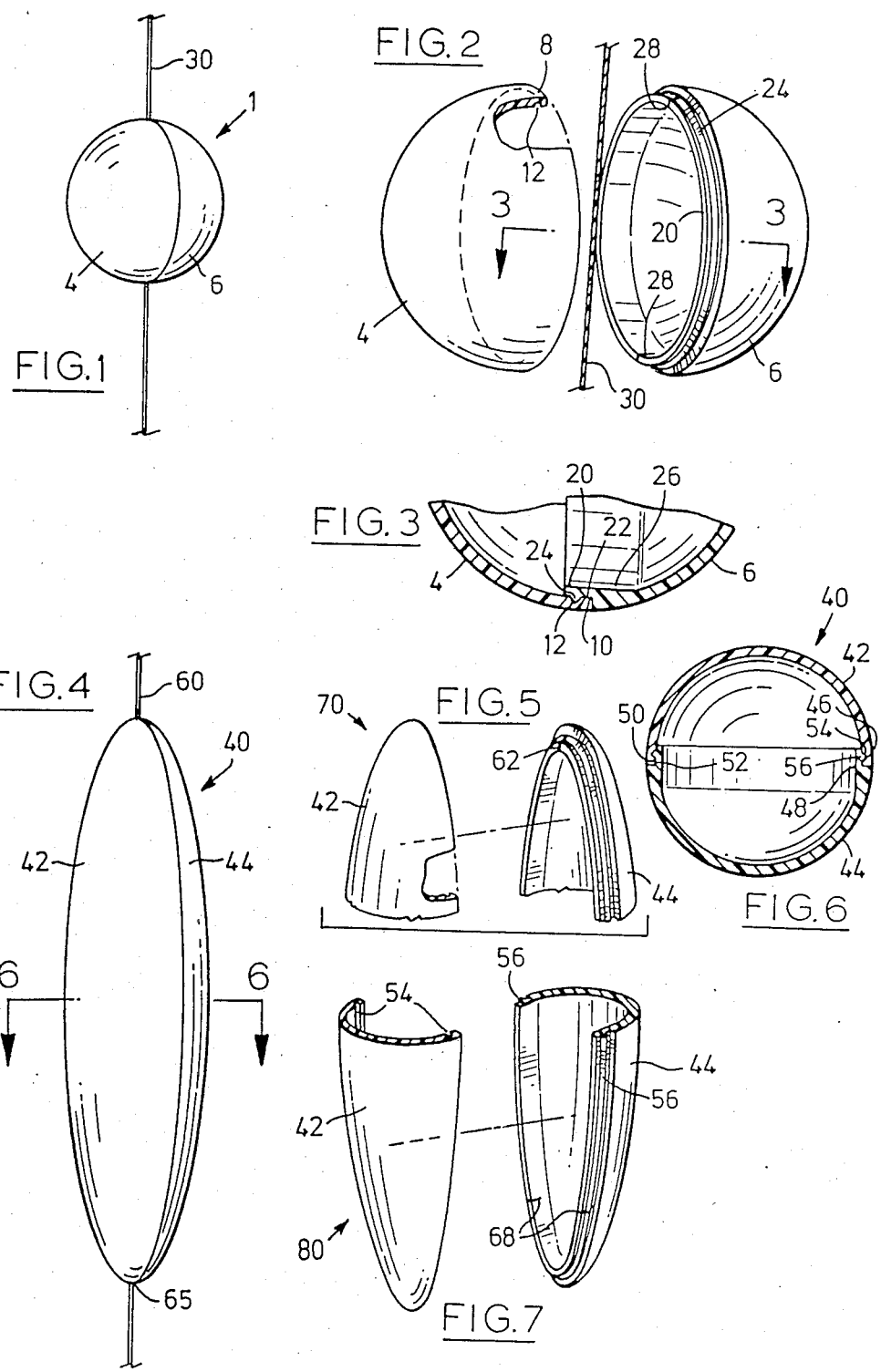

FISHING FLOAT

This invention relates to fishing floats.

Frequently, when fishing using a fishing line, the baited end portion of the line with the hook is suspended from a float. This ensures that the bait is suspended above the bottom, where it is expected fish of interest will be feeding. It is important that the float is securely attached to the line so that the line cannot move relative to the float, for example when casting or when a fish pulls under the line. As the portion of the line below the water surface cannot normally be seen, it is desirable that the angler should be confident that the bait and hook are maintained at the desired depth.

Various techniques are known for attaching a float to a fishing line. For example, a spherical float may have two formations at diametrically opposed locations on its surface. The fishing line is engaged with these formations. However, this relies solely on the frictional engagement between the line and the float to prevent relative movement therebetween. In practice, it is found that such a conventional float may slip along a line to which it is attached. As fisherman are reluctant to knot a fishing line, as it is difficult to undo a knot in a small diameter line, this difficulty cannot be readily overcome in conventional floats.

My earlier Canadian Pat. No. 1,036,354 describes an alternative float construction. The float construction includes a buoyant float body and a fishing line attachment member. The attachment member includes a slit dimensioned to receive and frictionally retain a fishing line. It is positioned so that a fishing line is trapped between the float body and the attachment member when they are coupled together. Such a constuction, whilst an improvement on other known fishing floats, has some disadvantages. The attachment member is relatively small. It is difficult to handle, particularly when an angler's hands are cold and wet. It can be easily dropped or misplaced. Since this attachment member has to be removed, engaged with the fishing line and then replaced, to attach a fishing float, it is easy for it to be misplaced in use. What is desired is a fishing float, that can be readily handled by an angler, and which is capable of simple, economical manufacture.

According to the present invention, there is provided a fishing float comprising:
- a first body member, which is formed as a shell and includes, along a free edge thereof a first coupling lip which has a first sealing surface and which coupling lip includes a groove; and
- a second body member, which is formed as a shell and includes, along a free edge thereof, a second coupling lip which has a second sealing surface and which coupling lip includes a rib projecting therefrom for engagement with the groove of the first body member;
- wherein at least one of the first and second body members is sufficiently resilient to permit engagement of the rib and groove, and at least two slits are provided in the coupling lips for receiving a fishing line;
- whereby, in use, the first and second body members are coupled together with the rib seated in the groove and with a fishing line extending through the two slits and across the float, the first and second sealing surfaces sealing the first and second body members together to form an integral float and to prevent the ingress of water.

Preferably, the lips of the first and second body members are so arranged as to provide a smooth exterior to the complete float. Thus, the second lip can be stepped in, and overlapped on the outside by the first lip.

The number and disposition of the slits can be varied, depending on the shape and intended use of the float. Where two slits only are provided, they could both be provided in one body member, or alternatively each body member could include one slit. Preferably, each body member member is provided with two slits, with the slits of the body members corresponding to one another.

For a better understanding of the present invention and to show more clearly how it may be carried into effect, reference will now be made, by way of example, to the accompanying drawings which show preferred embodiments of the present invention and in which:

FIG. 1 shows a perspective view of a first fishing float according to the present invention mounted on a fishing line;

FIG. 2 shows on an enlarged scale the two body members of the float of FIG. 1, in an exploded view on either side of a fishing line;

FIG. 3 shows, in cross-section, part of the fishing float of FIG. 2 along the line 3—3;

FIG. 4 shows a perspective view of a second embodiment of the fishing float mounted on a fishing line;

FIG. 5 shows a perspective view of upper ends of first variants of the body members of the float of the second embodiment;

FIG. 6 shows a section along the line 6—6 of the fishing float of FIGS. 4 and 5;

FIG. 7 shows a perspective view of lower ends of second variants of the body members of the float of the second embodiment.

Figure 8:
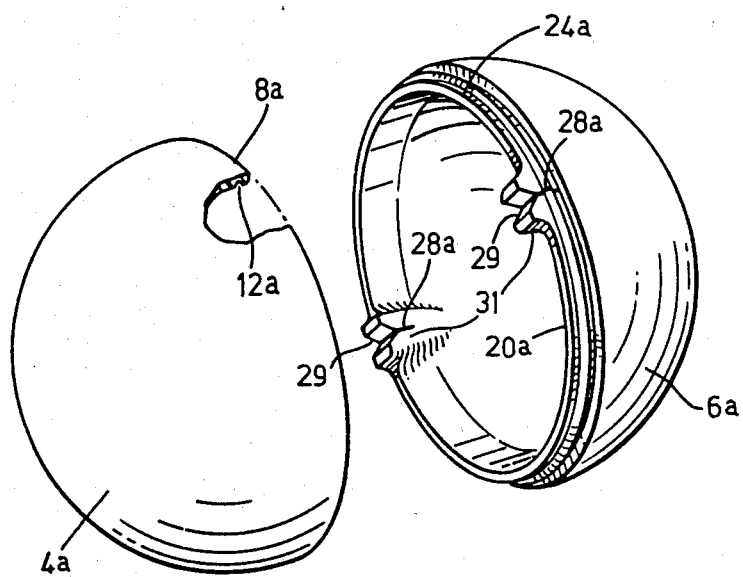
FIG. 8 shows a perspective exploded view of another embodiment of the fishing float.

Reference will first be made to FIGS. 1, 2 and 3 which show a first embodiment of the fishing float. This first embodiment is generally denoted by the reference 1. A fishing float 1 comprises two generally hemispherical body members 4 and 6. Each body member 4, 6 is in the form of a thin shell, as shown most clearly in FIG. 3.

The first body member 4 includes a free edge, and along this free edge there is a first coupling lip 8. An inner surface of the coupling lip 8, denoted by the reference 10, provides a first sealing surface, the purpose of which is explained below. In the lip 8, there is a groove 12 of generally triangular section. It should also be noted that the lip 8 is a smooth continuation of the main part of the first body member 4, and has the same thickness.

The second body member 6 is generally similar to the first body member 4, in that it is generally hemispherical. It includes a respective second coupling lip 20. Unlike the first coupling lip 8, this second coupling lip 20 is stepped radially inwards, by an amount corresponding to the thickness of the first coupling lip 8. The second coupling lip 20 includes a second sealing surface 22, facing radially outwards. Projecting from this second sealing surface 22 is a rib 24. The rib 24 and groove 8 have corresponding triangular sections. It is also to be noted that part of the inner surface of the body member 6, marked at 26, is generally cylindrical, to facilitate moulding of the second body member 6.

The sealing surfaces 10, 22 have been described as being on the radially inner and outer faces of the body members 4,6. Additionally, or instead, the sealing surfaces could be at the end face of the first coupling lip 8 and on the annular face of the second body member 6.

Additionally, the second body member 6 includes two slits 28 in its second lip 20, to accomodate a fishing line.

FIG. 1 shows the fishing float 1 located on a fishing line, designated by the reference 30, the two body members 4, 6 are first separated, as shown in FIG. 2. Then, one of the body members is fitted to the fishing line, by engaging the fishing line 30 in its slits or notches. Here, the second body member 6 is first fitted, by locating the fishing line 30 in the slits 28. If, the first body member 4 included slits, the line 30 could first be engaged with it. The two body members 4, 6 are then pressed together, so that the second coupling lip 20 slides inside the first coupling lip 8. When they are fully engaged with one another, the rib 24 will be engaged in the groove 12. Also, the sealing surfaces 10, 22 will abut one another, to form a seal between the two body members 4, 6. This configuration is shown in the section of FIG. 3. The fishing line 30 will then pass across the float 1, and be securely held.

To enable the body members 4, 6, to be fitted together, at least one of the body members 4, 6 is formed from a resilient material. Preferably, they are both formed from a resilient plastic material, so that, when they are fitted together the coupling lips 8, 20 can deflect radially outwards and inwards respectfully. Further, the resilient snap action of the rib 24 in the groove 12 serves to urge the two body members 4, 6 together so as to clamp a line and to form a good seal.

The slits 28 should be so dimensioned that, when the body members 4, 6 are snapped together, they tightly grip the fishing line 30. For this purpose, the slits 28 should be dimensioned according to the type of fishing line used. It is possible that, for a given float size, it may be desirable to have a number of different floats each having different slit sizes to accomodate different size lines. However, for general use, the slits 28 can be simple cuts in the coupling lip. The slits then grip and seal the fishing line, the material used being sufficiently resilient to enable the line to be inserted. Such an arrangement should accomodate most common line sizes. This arrangement should arrange that a good seal is formed between the body members 4, 6 and the fishing line 30. With the seal formed by the sealing surfaces 10, 22, the float 1 is water-tight and water cannot readily penetrate into it. It should therefore provide a good float action.

Reference will now be made to FIGS. 4, 5, 6, and 7, which show an alternative embodiment of the fishing float. This embodiment is generally denoted by the reference 40. FIGS. 5 and 7 show two different variants, which are designated by the references 70 and 80 respectively. This embodiment and variations of the invention has a generally sausage-shape.

The float 40 of FIG. 6 is generally similar in construction to the float 1. It comprises two body halves 42, 44. Each body half 42, 44 has a respective coupling lip 46, 48. The first body member 42 has a first lip 46 which is a continuation of the main part of the body, and the second body member 44 has an inwardly stepped coupling lip 48. Again, an inner surface of the second body member 44, adjacent the lip 48, is formed as a cylindrical surface, to simplify manufacture. The two sealing lips 46, 48 have complimentary, facing sealing surfaces 50, 52. In the first sealing surface 50, there is a groove of triangular section 54, whilst projecting from the second sealing surface 52, there is a corresponding rib 56 of triangular section. The two body members 42, 44 can thus be clipped together, similarly to the body members 4, 6.

Unlike the first embodiment of the fishing float 1, this fishing float 40 is not completely symmetrical. Consequently, it offers the possibility of being attached to a fishing line in different ways.

FIG. 4 shows the float 40 attached to a fishing line, indicated at 60, with the fishing line extending along its axis. For this arrangement, the top end of the float 40 is provided with a slit 62 in the body member 44, as snown in FIG. 5. Again, the slit 62 is a simple cut providing a small aperture for the line 60. As noted above, this aperture should be so dimensioned as to tightly grip the line 60. As indicated at 65, the lower end of the body member 44 can be provided with a corresponding slit to the slit 62.

This arrangement enables the float 40 to be secured to the line 60, as described above for the float 1. A tight seal is again provided by the sealing surfaces 50, 52 and by ensuring that the slits are a tight fit on the fishing line 60. Again, the float 40 is secured in position on the line 60 by the tight grip of the slits on the line 60. Additionally, the snap action of the groove and rib 54, 56 urges the two body members 42, 44 towards one another. As a consequence, the lip 50 is pressed against the step adjacent the lip 52, to additionally the trap line 60 and secure the float 40 in position and to provide further sealing.

FIG. 4 shows the float 40 orientated along the line 60, which is suitable for many types of fishing. However, it is sometimes desired that a long float of this shape should extend out from the line. To accomodate this, FIG. 7 shows a variation for use at one end of a float 80. The upper end would then be plain, with no further slits. In this variation of the float 80, two slits 66 are provided in the first body member 42 on opposite sides adjacent its lower end. Also, two further slits 68 are provided in the second coupling lip 52 of the second body member 44, as shown in FIG. 7. The slits 68 are aligned with one another, although they could be inclined to provide a greater grip on the line 60. Although not shown, a line can then be located extending through these slits 68 across the bottom of the float 40.

Reference will now be made to FIG. 8, which shows another variation of the fishing float. As this variation is the same as the embodiment of FIGS. 1, 2 and 3, the same references have been used with the suffix "a".

As before, the first and second body members 4a, 6a are intended to be coupled together by means of corresponding coupling lips. However, the second body member 6a now includes a projection 31 that extends both axially and radially, to provide more material to grip and seal a fishing line. The slit 28a is provided in the projection 31, and it includes a V-shape lead-in portion 29, to facilitate insertion of the fishing line. Thus, this variant enables the fishing line to be more readily inserted and secures and seals it more firmly.

It is to be appreciated that although only two shapes have been shown for the fishing float, many variations are possible within the broad scope of the present invention. Below, some of these variations or alternatives are set out.

Although in both the embodiments shown, the rib is provided on the coupling lip stepped inwards, and the groove is provided in the first coupling lip enclosing the second coupling lip, this is not essential. The rib could alternatively be provided protruding inwards from the first coupling lip, and the groove would then be provided in a radially outer surface of the second Although a groove and rib arrangement is shown, where the two body members have circular contacting faces, a screw thread can be used instead.

Although it is preferred for the line to be trapped between a coupling lip and step as shown, slits could be provided extending part way through both coupling lips. Then, the line would not be so trapped, but would instead be held by the slits of both body members.

Further, although the fishing float is shown as being hollow and formed from two separate body members, in some circumstances this may not provide sufficient integrity for the float. In particular, to ensure that the float will not sink or become flooded with water, it can be provided inside with one or more separate flotation bodies. For example, a solid cork flotation body or a 1-piece hollow plastic flotation body could be used. They would be dimensioned, so as to fit within the body members 4, 6 whose principal purpose would then be to secure the float to a fishing line and to prevent the flotation body being damaged.

It is suggested above that both the body members 4, 6 could be made from a resilient plastic, and they are preferably both formed from the same plastic. However, it is possible for the two body member to be formed from dissimilar materials. Thus, one could be formed from a relatively hard, unyielding plastic material, whilst the other is formed from a resilient plastic material.

Also, whilst the slits are shown as being aligned with one another, to provide greater security, the two slits on opposite side of one body member could be inclined. As a consequence, the fishing line will be bent through one or more angles as it passes through the slits, and it should provide friction serving to further hinder accidental movement of the float along the line.

Unlike know fishing floats, this fishing float can be readily and simply attached to a fishing line, so that it is symmetrical about the fishing line and no undue tension is placed on the line. Although the float can be arranged extending to one side of the line, unlike known floats, there is no necessity for this.

I claim:
1. A fishing float comprising:
   a first body member, which is formed as a shell and includes, along a free edge thereof, a first coupling lip which has a first sealing surface and which coupling lip includes a groove; and
   a second body member, which is formed as a shell and includes along a free edge thereof, a second coupling lip, which has a second sealing surface and which coupling lip includes a rib projecting therefrom for engagement with the groove of the first body member;
   wherein at least one of the first and second body members is sufficiently resilient to permit engagement of the ribs and groove, and at least two slits are provided in the coupling lips for receiving a fishing line;
   whereby, in use, the first and second body members are coupled together with the rib seated in the groove and with the fishing line extending through the two slits and across the float, the first and second sealing surfaces sealing the first and second body members together to form an integral float and to prevent the ingress of water.

2. A float as claimed in claim 1, in which the first coupling lip is arranged to overlap the second coupling lip.

3. A float as claimed in claim 2, in which the second coupling lip is stepped in, so that a flush joint is formed between the two body members.

4. A float as claimed in claim 1, wherein the second coupling lip overlaps the first coupling lip.

5. A float as claimed in claim 4, wherein the first coupling lip is stepped in, so that a flush joint is formed between the two body members.

6. A float as claimed in claim 1, wherein two slits are provided in the first body member only.

7. A float as claimed in claim 1, wherein two slits are provided in the second body member only.

8. A float as claimed in claim 1, wherein one slit is provided in the first body member and one slit is provided in the second body member.

9. A float as claimed in claim 5 wherein first body member includes two slits, which extend through the first coupling lip.

10. A float as claimed in claim 3, wherein the second body member includes two slits, which extend through the second coupling lip.

11. A float as claimed in claim 9 or 10, wherein the groove and rib are so dimensioned as to clamp a fishing line between the two body members.

12. A float as claimed in claim 9 or 10, wherein the two slits are diametrically opposed.

13. A float as claimed in claim 9 or 10, wherein the two slits are aligned.

14. A float as claimed in claim 9 or 10, wherein the two slits are inclined to one another.

15. A float as claimed in claim 1, wherein the float is spherical, and each of the body members is generally hemispherical.

16. A float as claimed in claim 1, which is elongate along a principal axis thereof and of circular section in a plane perpendicular to that axis.

17. A float as claimed in claim 1, which is elongate about a principal axis thereof and is of circular section in a plane perpendicular to that axis, and wherein one of the body members includes two slits for a fishing line.

18. A float as claimed in claim 7, wherein the two slits are at opposite ends of the float along its axis.

19. A float as claimed in claim 7, wherein the two slits are opposite one another adjacent a lower end of the float.

20. A float as claimed in claim 1, wherein each slit is provided in a portion of its respective body member that is enlarged radially and axially.

21. A float as claimed in claim 1, wherein each slit is provided with a V-shape lead in portion.

22. A float as claimed in claim 3, wherein each slit is formed in an enlarged portion of the second coupling lip, which enlarged portion extends radially and axially, and wherein each slit is provided with a V-shape lead-in portion.

* * * * *